(12) United States Patent
Okuike

(10) Patent No.: US 8,842,647 B2
(45) Date of Patent: Sep. 23, 2014

(54) WIRELESS COMMUNICATION TERMINAL

(75) Inventor: Kazuyuki Okuike, Kanagawa (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 12/684,596

(22) Filed: Jan. 8, 2010

(65) Prior Publication Data

US 2010/0182986 A1 Jul. 22, 2010

(30) Foreign Application Priority Data

Jan. 16, 2009 (JP) ................................ P2009-007342

(51) Int. Cl.
*H04W 4/00* (2009.01)
*H04K 1/10* (2006.01)
*H04W 56/00* (2009.01)

(52) U.S. Cl.
CPC ..................................... *H04W 56/00* (2013.01)
USPC .......................................... 370/338; 375/260

(58) Field of Classification Search
USPC ................. 370/328, 338, 339, 231, 235, 465; 375/260
See application file for complete search history.

(56) References Cited

U.S. PATENT DOCUMENTS 7,983,216 B2 * 7/2011 Iyer et al. ...................... 370/329
2007/0109973 A1 * 5/2007 Trachewsky .................. 370/252

FOREIGN PATENT DOCUMENTS

| JP | 2008-167149 | 7/2008 |
| JP | 2009-538053 | 10/2009 |
| WO | WO 2007/137001 | 11/2007 |

OTHER PUBLICATIONS 802.15.2™, Part 15.2: Coexistence of Wireless Personal Area Networks with Other Wireless Devices Operating in Unlicensed Frequency Bands. IEEE Std. 802.15.2™-Aug. 28, 2003. pp. 47-58.

* cited by examiner

*Primary Examiner* — Afshawn Towfighi
(74) *Attorney, Agent, or Firm* — Frommer Lawrence & Haug LLP; William S. Frommer

(57) ABSTRACT

A wireless communication terminal includes: a communication timing arbitration section adapted to control the allocation of first and second communication protection periods. The communication timing arbitration section exercises control so that the first and second wireless communication terminals use the same frequency band before the first wireless communication terminal enters an active communication period, and also exercises control so that a packet containing a network allocation vector is transmitted according to the second communication scheme, the network allocation vector being adapted to define the communication protection period for the first wireless communication terminal.

10 Claims, 4 Drawing Sheets

⟨COMMUNICATION PROTECTION PERIOD ALLOCATION CONTROL: FIRST EXAMPLE⟩

⟨COMMUNICATION PROTECTION PERIOD ALLOCATION CONTROL: SECOND EXAMPLE⟩

⟨COMMUNICATION PROTECTION PERIOD ALLOCATION CONTROL: THIRD EXAMPLE⟩

*IN BOTH CASES (1) AND (2), NULL DATA IS ADDRESSED TO THE OWN TERMINALS

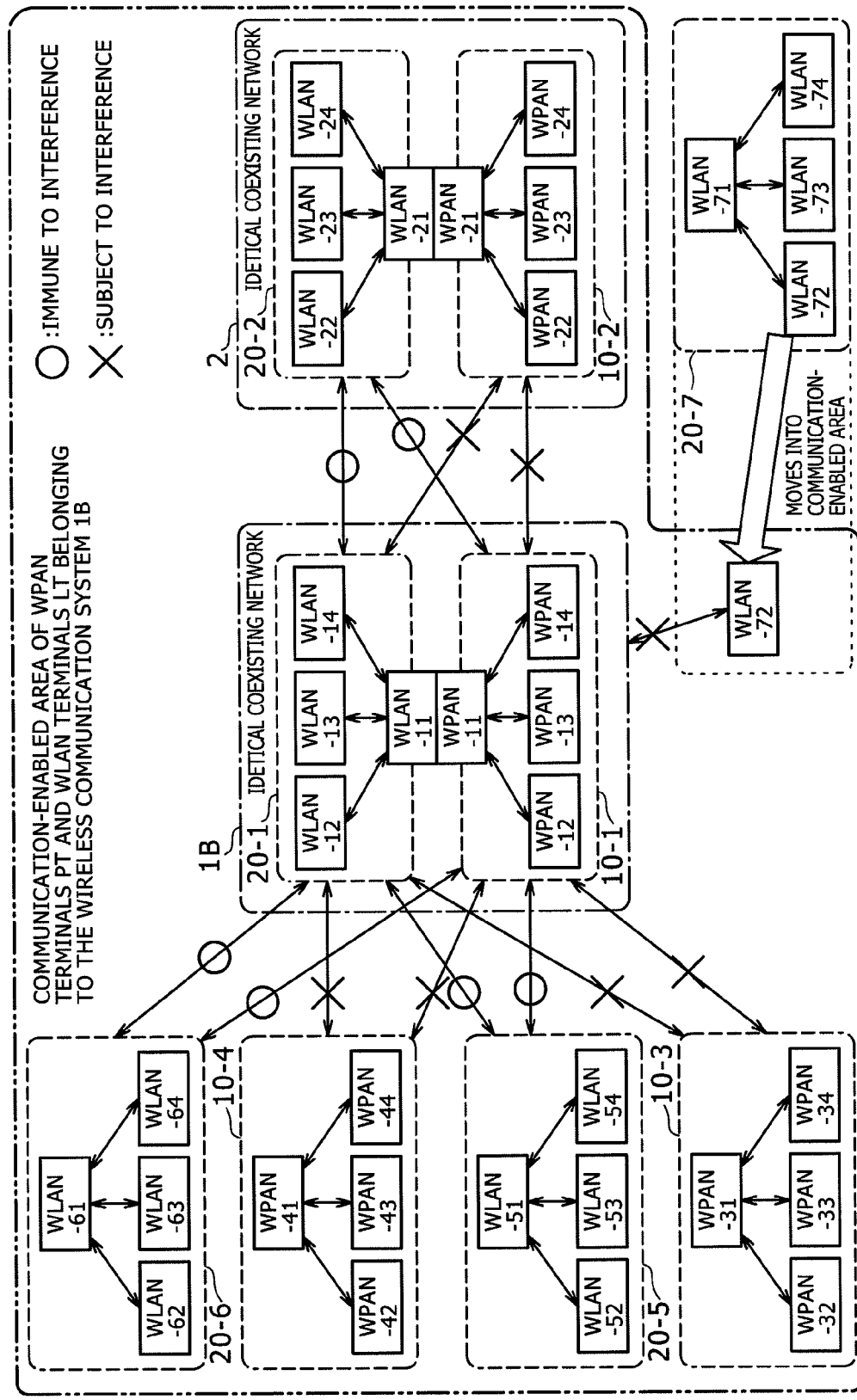

WIRELESS COMMUNICATION TERMINAL

BACKGROUND OF THE INVENTION

1. Field of the Invention

The present invention relates to a wireless communication terminal, and more particularly to a mechanism for coexistence of communication networks using different communication schemes.

2. Description of the Related Art

Operating two or more wireless communication schemes leads to a problem in achieving substantially interference-free coexistence. For example, a variety of wireless communication schemes have been proposed and commercialized to date. Some of such schemes operate in the same frequency band. In this case, radio interference may take place between terminals using different wireless communication schemes or between different communication modules if a single terminal includes communication modules using different wireless communication schemes.

For this reason, a mechanism has been devised designed to suppress the impact of mutual interference so as to permit coexistence of a plurality of communication schemes (see, for example, JP-T-2005-529549, hereinafter referred to as Patent Document 1).

The mechanism disclosed in Patent Document 1 avoids mutual interference by applying a scheduling policy to transmissions conducted under different communication standards.

SUMMARY OF THE INVENTION

In the communication-enabled area of a WLAN/WPAN coexisting terminal, there may be WLAN and WPAN terminals belonging to a network different from that to which the WLAN/WPAN coexisting terminal belongs, in addition to WLAN and WPAN terminals belonging to the same network as the WLAN/WPAN coexisting terminal.

The same network as that to which the WLAN/WPAN coexisting terminal belongs will be hereinafter also referred to as the identical network, and the network different from that to which the WLAN/WPAN coexisting terminal belongs as the non-identical network. The WLAN and WPAN terminals belonging to the same network as the WLAN/WPAN coexisting terminal will be hereinafter also referred to as the identical network WLAN and WPAN terminals, respectively. The WLAN and WPAN terminals belonging to a network different from that to which the WLAN/WPAN coexisting terminal belongs will be hereinafter also referred to as the non-identical network WLAN and WPAN terminals, respectively.

The mechanism disclosed in Patent Document 1 can prevent interference within the same network. In the presence of a different network in the communication-enabled area, however, this mechanism cannot prevent interference in communication with the different network. That is, interference may take place between the "the WLAN/WPAN coexisting terminal, or identical network WLAN or WPAN terminal" and "non-identical network WLAN or WPAN terminal."

There is a need for the present invention to provide, in an environment where communication networks using different communication schemes coexist, a mechanism for suppressing interference to a wireless communication terminal belonging to one communication network from a wireless communication terminal belonging to another network.

In one embodiment of the present invention, an overall communication network (so-called coexisting network with non-identical communication schemes) includes first and second communication networks. The first communication network includes a first wireless communication terminal adapted to communicate according to a first communication scheme. The second communication network includes a second wireless communication terminal adapted to communicate according to a second communication scheme different from the first communication scheme.

A communication timing arbitration section is provided. The same section controls the allocation of first and second communication protection periods. The first communication protection period is used for communication with the first wireless communication terminal belonging to the first communication network using the first communication scheme. The second communication protection period is used for communication with the second wireless communication terminal belonging to the second communication network using the second communication scheme different from the first communication scheme.

The communication timing arbitration section exercises control so that the first and second wireless communication terminals use the same frequency band before the first wireless communication terminal enters an active communication period. The same section also exercises control so that a packet containing a network allocation vector is transmitted according to the second communication scheme. The network allocation vector defines the communication protection period for the first wireless communication terminal.

The second wireless communication terminals which can receive the packet containing the network allocation vector communicate according to the second communication scheme, irrespective of whether these terminals belong to the identical network using the second communication scheme and under the supervision of the communication timing arbitration section. After the receipt of the packet containing the network allocation vector, the second wireless communication terminals which communicate in the same frequency band do not communicate during the first communication protection period for the first wireless communication terminal, irrespective of whether these terminals belong to the identical communication network.

The communication timing arbitration section controls the first wireless communication terminal which belongs to the identical network using the first communication scheme and under the supervision of the communication timing arbitration section in such a manner as to use the same frequency band as the second wireless communication terminals for communication. A communication protection period is guaranteed to the first wireless communication terminal for protection from the second wireless communication terminals which have received the packet containing the network allocation vector and which communicate in the same frequency band.

The first wireless communication terminal belonging to the identical network using the first communication scheme and under the supervision of the communication timing arbitration section is immune to interference from the second wireless communication terminals, irrespective of whether these terminals belong to the identical network using the second communication scheme and under the supervision of the communication timing arbitration section.

The present embodiment ensures that the first wireless communication terminal under the supervision of the communication timing arbitration section is immune to interference from the second communication terminals, irrespective of whether these terminals belong to the identical network under the supervision of the communication timing arbitration section. In other words, the present embodiment suppresses interference to the first wireless communication terminal belonging to the first network from the second wireless communication terminals belonging to the second network to which the first wireless communication terminal does not belong.

That is, the present embodiment prevents interference from the communication terminals of the second network which have received the packet containing the network allocation vector, irrespective of whether the second wireless communication terminals are under the supervision of the communication timing arbitration section, thus protecting communication in the first network under the supervision of the communication timing arbitration section.

BRIEF DESCRIPTION OF THE DRAWINGS

FIG. 6 is a diagram describing communication immune to interference thanks to the mechanism of the present embodiment and communication subject to interference.

DETAILED DESCRIPTION OF THE PREFERRED EMBODIMENT

Figure 1:
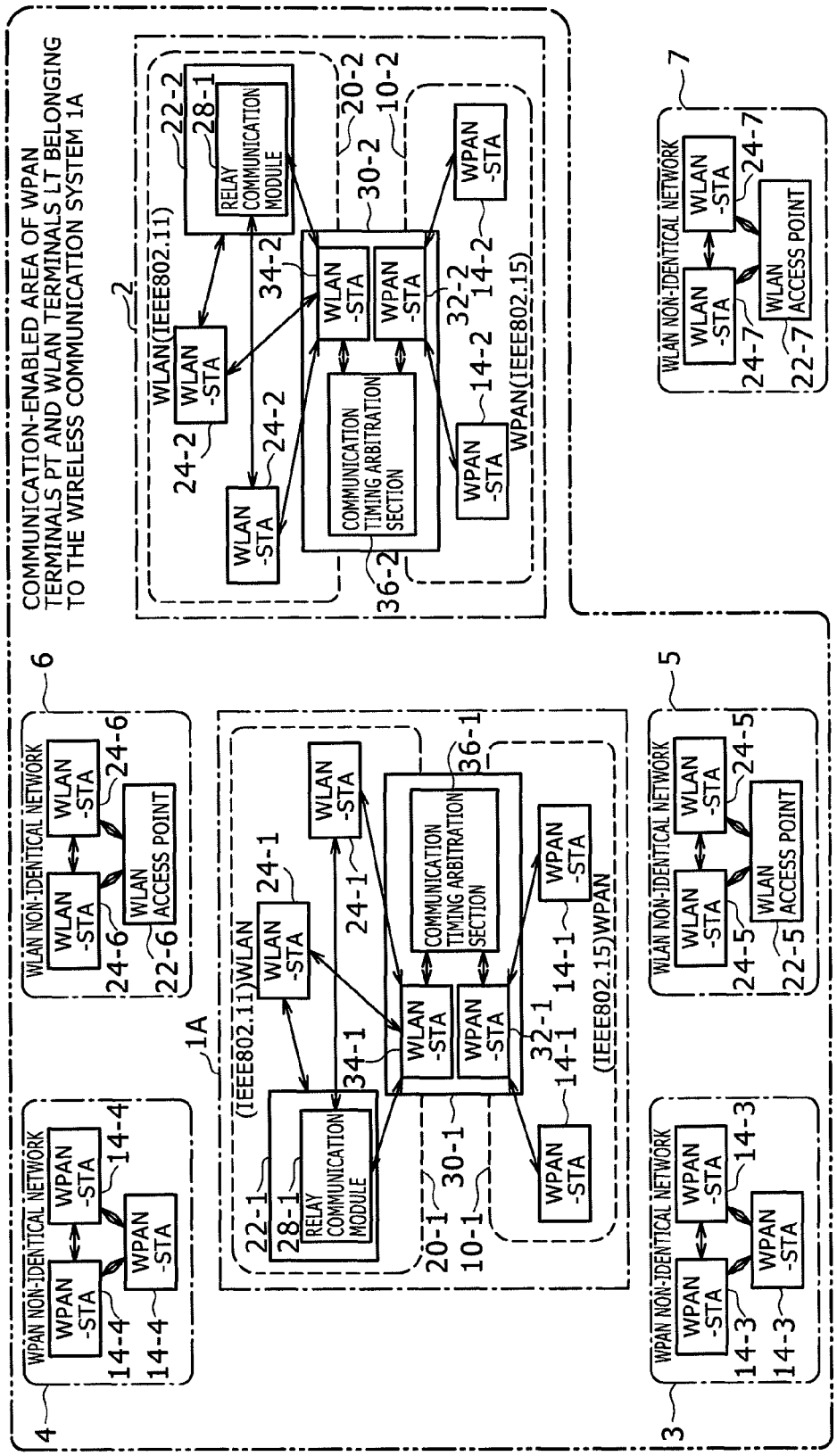
FIG. 1 is a diagram illustrating the configuration or typical example of a wireless communication system according to a present embodiment.

A detailed description will be given below of an embodiment of the present invention with reference to the accompanying drawings. It should be noted that the description will be given in the following order.
1. Definitions
2. System Outline
3. System Configuration: Typical Example
4. Timing Arbitration: First Example (No Overlapping Protection Periods and Adaptive Frequency Hopping)
5. Timing Arbitration: Second Example (Overlapping Protection Periods and Adaptive Frequency Hopping)
6. Timing Arbitration: Third Example (No Overlapping Protection Periods and Scheme Other Than Adaptive Frequency Hopping)
7. System Configuration: Modification Example
8. Overview of the Communication Protection Mechanism of the Present Embodiment <Definitions>

The terms used in the embodiment described later are defined particularly in the following respects.
1) Identical Network
This term refers to a communication network in which only communication terminals using the same communication scheme are connected together in such a manner as to be able to communicate with each other.

2) Identical Coexisting Network
This term refers to a network which includes first and second identical networks. The first and second identical networks are connected to a coexisting terminal which includes first and second communication terminals. The first communication terminal is adapted to communicate according to a first communication scheme and belongs to a first communication network. The second communication terminal is adapted to communicate according to a second communication scheme and belongs to a second communication network. An example thereof is a WLAN/WPAN coexisting network which includes a WPAN and WLAN which are connected to a WLAN/WPAN coexisting terminal.

3) Non-Identical Networks
This term refers to the relationship between one identical network and another identical network. For example, a first communication network using a first communication scheme (e.g., network to which only WPAN terminals belong) and a second communication network using a second communication scheme (e.g., network to which only WLAN terminals belong) are non-identical networks. Further, other identical networks other than identical coexisting network are also non-identical networks.

4) Communication Problem (Mutual Interference) to be Solved by the Control Method of the Present Embodiment for Allocating Communication Protection Periods The present embodiment protects communication according to a first communication scheme in an identical network from communication according to a second communication scheme in a non-identical network. For example, WPAN communication in a WLAN/WPAN coexisting network is protected from WLAN communication in a non-identical network.

Whether communication according to "a given communication scheme" in an identical coexisting network can be protected from communication according to the same communication scheme as the "given communication scheme" in a non-identical network depends on what type of communication scheme the given communication scheme is. For example, as far as currently common communication standards are concerned, communication can be protected when the "given communication scheme" is the WLAN scheme. However, communication cannot be protected if the "given communication scheme" is the WPAN scheme. That is, it is impossible to protect communication according to the WPAN scheme in an identical coexisting network from communication according to the WLAN scheme in a non-identical network.

<System Outline>

With the widespread use of wireless communication today, there are times when a LAN (Local Area Network) is configured wirelessly. A variety of wireless communication schemes have been proposed and commercialized to date for this purpose. For example, wireless communication techniques for broadband private wireless system (WLAN) have been standardized by IEEE802.11, and those for small-scale networks for mobile information devices by IEEE802.15.1.

A mobile information device is designed to be carried along by a person, and because the person is at the core of the network thereof, the wireless communication network for mobile information devices serving as communication terminals is referred to as a WPAN (Wireless Personal Area Network).

The IEEE802.11 WLAN standard adopts spread spectrum or DSSS (Direct Sequence Spread Spectrum) as its communication scheme in which communication is conducted at a distance of 50 m or so using the 2.4 GHz frequency band.

The IEEE802.15.1 WPAN standard adopts spread spectrum frequency hopping as its communication scheme in which communication is conducted at a distance of 10 m or so using the 2.4 GHz frequency band.

In today's personal computers and other devices, these standards are often available in the same terminal. Normally, wireless communications according to these standards use the same frequency band. Communications conducted at the same time in the same space will lead to interference. That is, if a plurality of wireless communication modules are incorporated in a single enclosure, these modules are arranged in proximity to each other due to space restrictions. This leads to mutual radio interference between the modules. In particular, the WLAN communication based on the IEEE802.11 standard and the WPAN communication based on the IEEE802.15.1 standard use the same 2.4 GHz band, resulting in more problematic mutual interference.

The study on the coexistence of WLAN and WPAN in the IEEE802.15.2 standard as an interference prevention mechanism has considered schemes for reducing interference in a WLAN/WPAN coexisting terminal.

More specifically, among the techniques available are AWMA (Alternating Wireless Medium Access) and PTA (Packet Traffic Arbitration). Both of these techniques use a TDM (Time Division Multiplexing) approach to separate the WLAN and WPAN communications in time. Both of these techniques can reduce interference between terminals belonging to the identical network.

However, non-identical networks commonly often exist in the same space. The above schemes are requirements governing a WLAN/WPAN coexisting terminal and cannot prevent interference with a communication terminal belonging to a non-identical network. That is, even if interference with communication terminals belonging to the identical network can be prevented, interference will take place, in the presence of a number of non-identical networks in the communication-enabled area, with a communication terminal belonging to one of the non-identical networks. As a result, it is impossible to achieve a desired throughput.

For this reason, the present embodiment defines the WLAN and WPAN communication periods to provide a mechanism for protecting communication according to one communication scheme from communication according to another communication scheme in an environment where a WLAN and WPAN, different in wireless communication scheme, coexist. In particular, the present embodiment provides a mechanism for suppressing interference from a non-identical network WLAN terminal to an identical network WPAN terminal belonging to the same network as a WLAN/WPAN coexisting terminal. That is, the mechanism protects WPAN communication in an identical network from WLAN communication in a non-identical network.

In order to protect communication of an identical network WPAN terminal from communication of a non-identical network WLAN terminal, the identical network WPAN terminal uses the same frequency band as the identical network WLAN terminal for communication in the present embodiment. Further, prior to the beginning of communication according to a WLAN or WPAN scheme, a packet containing information about the communication period in a NAV is transmitted according to the WLAN scheme. The term "NAV" refers to a network allocation vector, and is designed to suppress data transmissions from other WLAN terminals. After the receipt of the NAV, the WLAN terminals do not transmit any data during the period indicated by the NAV, irrespective of whether the WLAN terminals belong to the identical or non-identical network.

For example, prior to the beginning of communication of an identical network WLAN terminal, a packet is transmitted according to the WLAN scheme. The packet contains information about the communication period of the identical network WLAN terminal in a NAV. This not only protects the identical network WLAN terminal from interference from other identical network WLAN terminals and identical network WPAN terminals, but also suppresses interference from non-identical network WLAN terminals belonging to other networks, thus protecting the WLAN packet.

Further, prior to the beginning of communication of an identical network WPAN terminal, a packet is transmitted according to the WLAN scheme. The packet contains information about the communication period of the identical network WPAN terminal in a NAV. This not only protects the identical network WPAN terminal from interference from other identical network WPAN terminals and identical network WLAN terminals, but also suppresses interference from non-identical network WLAN terminals belonging to other networks, thus protecting the WPAN packet.

<System Configuration: Typical Example>

FIG. 1 is a diagram illustrating the configuration (typical example) of a wireless communication system 1A according to the present embodiment. As illustrated in FIG. 1, the wireless communication system 1A includes a WPAN 10_1 and WLAN 20_1. The WPAN 10_1 serves as a first communication network using a first communication scheme.

The WLAN 20_1 serves as a second communication network using a second communication scheme. The WPAN 10_1 and WLAN 20_1 coexist in the wireless communication system 1A. The IEEE802.15 standard is used as the first communication scheme, and the IEEE802.11 standard as the second communication scheme. Wireless communication terminals compliant with each of the communication schemes belong to each of the communication networks.

As far as the distinction between the WPAN and WLAN is concerned, the networks approved generally as a WPAN and WLAN are acceptable. On the other hand, each of the standards of the communication schemes has derivative standards. In the present embodiment, any of these derivative standards is acceptable, unless otherwise specified. For example, the IEEE802.11 standard has derivative standards including IEEE802.11a, IEEE802.11b and IEEE802.11g. The IEEE802.15 standard has derivative standards including IEEE802.15.1 and IEEE802.15.4.

The WPAN10_1 includes a plurality of WPAN stations 14_1 (WPAN-STA) and a coexisting terminal 30_1. The coexisting terminal 30_1 has a WPAN data communication module 32_1 (WPAN-STA), WLAN data communication module 34_1 (WLAN-STA) and communication timing arbitration section 36_1 contained in a single enclosure. The coexisting terminal 30_1 serves as a master performing centralized control of the WPAN stations 14_1. The data communication module 32_1 is an example of a first wireless communication section, and the data communication module 34_1 an example of a second wireless communication section.

The WPAN stations 14_1 and the data communication module 32_1 of the coexisting terminal 30_1 are all examples of a WPAN terminal belonging to an identical network (identical network WPAN terminal). Although not illustrated, each of the WPAN stations 14_1 has a data communication module similar to the data communication module 32_1 contained therein.

Thanks to the IEEE802.15 standard used by the WPAN 10_1, data communication between the identical network WPAN terminals belonging to the WPAN 10_1 is controlled by the WPAN data communication module 32_1 in such a manner as to avoid collisions.

The WLAN 20_1 includes a WLAN access point 22_1 (WLAN-AP), a plurality of WLAN stations 24_1 (WLAN-STA) and the coexisting terminal 30_1. The WLAN access point 22_1 includes a relay communication module 28_1.

In infrastructure mode, the WLAN stations 24_1 and the WLAN data communication module 34_1 of the coexisting terminal 30_1 may communicate with other stations via the WLAN access point 22_1 or may alternatively communicate only with the WLAN access point 22_1. In ad hoc mode, the WLAN stations 24_1 and the WLAN data communication module 34_1 of the coexisting terminal 30_1 independently communicate with each other.

The relay communication module 28_1, WLAN stations 24_1 and data communication module 34_1 of the coexisting terminal 30_1 are all examples of a WLAN terminal belonging to an identical network (identical network WLAN terminal). Although not illustrated, each of the WLAN stations 24_1 has a data communication module similar to the data communication module 34_1 contained therein.

Thanks to the IEEE802.11 standard used by the WLAN 20_1, data communication between the identical network WLAN terminals belonging to the WLAN 20_1 is controlled by the WLAN access point 22_1 and WLAN data communication module 34_1 in such a manner as to avoid collisions.

In the communication-enabled area of the WPAN 10_1 and WLAN 20_1, i.e., in the communication-enabled area of the coexisting terminal 30_1, there are non-identical networks in addition to the WPAN 10_1 and WLAN 20_1. Non-identical network WLAN terminals and WPAN terminals not belonging to the WPAN 10_1 or WLAN 20_1 belong to such non-identical networks. For example, there is a coexisting non-identical network 2 configured similarly to the wireless communication system 1A which is a WLAN/WPAN coexisting network with the coexisting terminal 30_1 playing a central role. Further, there are WPAN non-identical networks 3 and 4 to which only non-identical network WPAN terminals belong. Still further, there are WLAN non-identical networks 5 and 6 to which only non-identical network WLAN terminals belong. Moreover, there is a WLAN non-identical network 7 outside the communication-enabled area of the coexisting terminal 30_1. Only non-identical network WLAN terminals belong to the WLAN non-identical network 7.

Numeral "_2" is assigned to the constituent components of the coexisting non-identical network 2 as a reference. Numeral "_3" is assigned to the constituent components of the WPAN non-identical network 3 as a reference. Numeral "_4" is assigned to the constituent components of the WPAN non-identical network 4 as a reference. Numeral "_5" is assigned to the constituent components of the WLAN non-identical network 5 as a reference. Numeral "_6" is assigned to the constituent components of the WLAN non-identical network 6 as a reference. Numeral "_7" is assigned to the constituent components of the WLAN non-identical network 7 as a reference.

In a non-identical network, a WPAN terminal serves as an identical network WPAN terminal, and a WLAN terminal as an identical network WLAN terminal, as in the WPAN 10_1 and WLAN 20_1 of the wireless communication system 1A. In the coexisting non-identical network 2, therefore, data communication between the WPAN terminals and data communication between the WLAN terminals are controlled in such a manner as to avoid collisions for mutual communication. In the WPAN non-identical networks 3 and 4, data communication between the WPAN terminals is controlled in such a manner as to avoid collisions for mutual communication. In the WLAN non-identical networks 5 to 7, data communication between the WLAN terminals is controlled in such a manner as to avoid collisions for mutual communication.

Communication between the WPAN terminals belonging to the WPAN 10_1 is referred to as WPAN communication, and communication between the WLAN terminals belonging to the WLAN 20_1 as WLAN communication.

Here, when we focus attention on the wireless communication system 1A, the coexisting non-identical network 2, WPAN non-identical networks 3 and 4 and WLAN non-identical networks 5 and 6 are non-identical networks. Interference from the WPAN and WLAN terminals belonging to these non-identical networks may pose a problem.

As a countermeasure against this problem, the communication timing arbitration section 36_1 exercises control so that the identical network WPAN and WLAN terminals use the same frequency band. The same section 36_1 also exercises control so that a packet containing information about the WPAN communication period in a NAV is transmitted according to the WLAN scheme. Further, the same section 36_1 controls the allocation of first and second communication protection periods. During the first communication protection period, communication of the WPAN 10_1 using the same frequency band as the identical network WLAN terminals is protected. During the second communication protection period, communication of the WLAN 20_1 is protected.

In addition to time division multiplexing using a WLAN-scheme-based NAV, the identical network WPAN terminal is controlled in such a manner as to use the vacant frequency band. Time division multiplexing alone cannot prevent interference from the non-identical network WLAN terminals to the identical network WPAN terminal. Therefore, control is exercised using a WLAN-scheme-based NAV so that the identical network WPAN terminal uses the same vacant time and frequency, which is a characteristic feature of the present embodiment.

The WLAN terminals which can receive the packet containing the NAV communicate according to the second communication scheme, i.e., the WLAN scheme, irrespective of whether these terminals belong to the WLAN 20_1 under the supervision of the communication timing arbitration section 36_1. After the receipt of the packet containing the NAV, the WLAN terminals do not communicate during the first communication protection period for the identical network WPAN terminals belonging to the WPAN 10_1, irrespective of whether the WLAN terminals belong to the WLAN 20_1.

For this reason, a first communication protection period is guaranteed to the identical network WPAN terminal belonging to the WPAN 10_1 for protection from the WLAN terminals which have received the packet containing the NAV. As a result, the identical network WPAN terminal is immune to interference from these WLAN terminals, irrespective of whether the WLAN terminals belong to the WLAN 20_1 under the supervision of the communication timing arbitration section 36_1.

This makes it possible to not only prevent interference between WPAN communications, between WLAN communications, and between WPAN and WLAN communications, but also protect WPAN communication of an identical network WPAN terminal from interference from communication of a non-identical WLAN terminal using the same frequency band. That is, the present embodiment prevents interference from the WLAN terminals which have received the packet containing the NAV, irrespective of whether these terminals are under the supervision of the communication timing arbitration section 36_1, thus protecting data communication in the WPAN 10_1 under the supervision of the communication timing arbitration section 36_1.

It is needless to say that the identical network WPAN terminal is also immune to interference from non-identical network WLAN and WPAN terminals using different frequency bands.

It should be noted that because the terminals independently determine by themselves the transmission timing in the present embodiment, the coexisting terminal 30_1 includes the communication timing arbitration section 36_1 together with the WPAN data communication module 32_1 and WLAN data communication module 34_1 in its enclosure. The communication timing arbitration section 36_1 plays the role of controlling the WLAN and WPAN communication timings. Further, if the present embodiment is not used, the WLAN terminals independently transmit data, making it impossible to control the communication timings. In the present embodiment, therefore, a NAV is used to control the communication timings. As a result, the present invention is effective both in infrastructure and ad hoc mode.

<Timing Arbitration: First Example>

Figure 2:
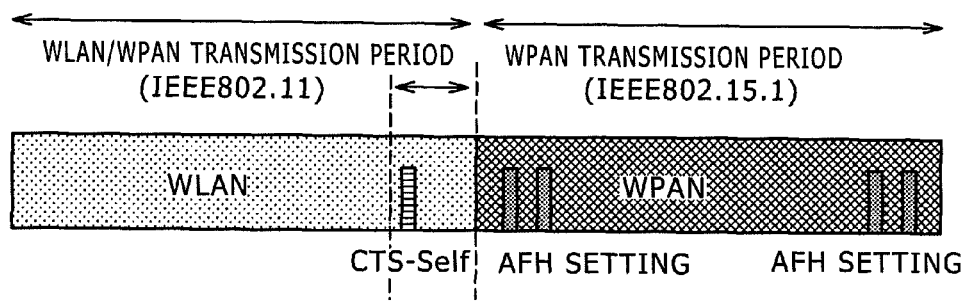
FIG. 2 is a diagram describing a first example of a control method of a communication timing arbitration section for allocating communication protection periods.

FIG. 2 is a diagram describing a first example of a control method used by the communication timing arbitration section 36_1 for allocating a first communication protection period for WPAN communication (WPAN communication protection period) and a second communication protection period for WLAN communication (WLAN communication protection period). That is, the diagram in FIG. 2 describes the scheduling of the communication periods according to the two communication schemes.

The allocation control method in the first example shows a case in which the WPAN and WLAN communication protection periods do not overlap. Further, the communication timing arbitration section 36_1 uses adaptive frequency hopping to control the identical network WPAN terminals of the WPAN 10_1 so that these identical network WPAN terminals use the same frequency band as the identical network WLAN terminals of the WLAN 20_1.

FIG. 2 shows a timing diagram illustrating two communication periods, i.e., the communication period of the WPAN 10_1 (substantially the WPAN communication protection period) and that of the WLAN 20_1 (substantially the WLAN communication protection period).

During the WLAN communication period (i.e., WLAN communication protection period), request to send RTS and clear to send CTS messages (packets) are exchanged, followed by the transmission and reception of data. The request to send RTS contains information about the transmission node (identical network WLAN terminal on the transmitting side) and the reception node (identical network WLAN terminal on the receiving side). When the reception node receives the RTS message, it transmits the CTS message when it can receive data. When the transmission node receives the CTS message, it transmits data. There is no likelihood that data collision may occur because all the nodes monitor the RTS message.

For example, the WLAN access point 22_1 normally transmits an RTS frame to the identical network WLAN terminals before it transmits a data or management frame. The RTS frame is designed to enable the identical network WLAN terminals. When the identical network WLAN terminals receive the RTS frame, these terminals enable themselves and transmit a CTS frame in response to the RTS frame. This allows for all the identical network WLAN terminals to receive a plurality of spatial streams from all the identical network WLAN terminals of the WLAN access point 22_1.

Incidentally, in the IEEE802.11g and IEEE802.11n standards, CTS/Self or CTS-to-self may be used rather than RTS/CTS. When the CTS-to-self mechanism (CTS-Self scheme) is used, the identical network WLAN terminal using the IEEE802.11g or IEEE802.11n standard transmits a short CTS frame addressed to itself so that the necessary timing information is communicated to the MAC layer in the neighboring legacy devices to protect its transmissions which will follow.

Here, the data communication module 32_1 belonging to the WPAN 10_1 refrains from communication during the communication period of the WLAN 20_1. At the end of the communication period of the data communication module 34_1 belonging to the WLAN 20_1, the communication timing arbitration section 36_1 exercises control so that a NAV is transmitted under MAC (Medium Access Control) according to the IEEE802.11 standard. At this time, the communication timing arbitration section 36_1 ensures that the period in the NAV matches the WPAN communication protection period.

Here, the present embodiment uses the CTS-Self scheme rather than the RTS/CTS scheme. The reason for this is as follows. That is, if the RTS/CTS scheme is used, the NAV of the device which receives an RTS is not updated. The device which receives the RTS can transmit data. As a result, the control method for allocating the communication protection periods according to the present embodiment is not effective.

The WLAN terminals which receive a CTS-Self packet containing a NAV indicating the first communication protection period refrain from communication during the period indicated by the NAV (first communication protection period), irrespective of whether the WLAN terminals belong to the WLAN 20_1. In the IEEE802.11 standard, for example, the WLAN terminals which receive a CTS-Self packet do not communicate during the period indicated by the NAV.

This prevents transmission of WLAN data between the identical network WLAN terminals during the WPAN communication period, thus protecting WPAN communication from WLAN communication. As a result, it is possible to prevent interference from the WLAN terminals which have received a CTS-Self packet containing a NAV indicating the first communication protection period during the WPAN communication period of the WPAN 10_1, irrespective of whether the WLAN terminals belong to the WLAN 20_1. That is, in the present embodiment, the identical network WPAN terminals occupy the frequency band for a specific period of time by setting a NAV. The identical and non-identical network WLAN terminals which have received a CTS-Self packet containing a NAV indicating the first communication protection period are prohibited from communication.

During the WPAN communication period of the data communication module 32_1, the communication timing arbitration section 36_1 does not engage in ordinary frequency hopping but instead exercises control so that communication is conducted in the same frequency band as the WLAN 20_1 by means of AFH (Adaptive Frequency Hopping). AFH allows for the spectrum band used to be automatically changed. Here, therefore, the IEEE802.15.1 standard is, for example, used as the first communication scheme.

The AFH technique avoids the WPAN data communication module 32_1 from using the frequency band occupied by other communication module in the same band by allowing the same module 32_1 to hop between available frequencies. This ensures stable communication according to the WPAN protocol.

In this frequency band, WLAN communication is suppressed, ensuring "better protection" of WPAN data from WLAN data. The term "better protection" means that communication of the identical network WPAN terminals belonging to the WPAN 10_1 of the identical coexisting network is protected not only from the identical network WLAN terminals belonging to the WLAN 20_1 of the identical coexisting network but also from the non-identical network WLAN terminals. The term "non-identical network" refers to the coexisting non-identical network and WLAN non-identical networks 5 and 6 in the case of the example shown in FIG. 1. In this example, it is impossible to prevent interference from the WPAN non-identical networks 3 and 4 shown in FIG. 1 to the identical network WPAN terminals.

<Timing Arbitration: Second Example>

Figure 3:
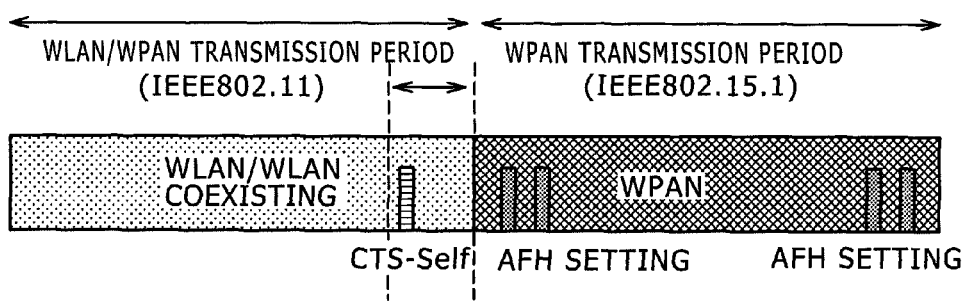
FIG. 3 is a diagram describing a second example of the control method of the communication timing arbitration section for allocating the communication protection periods.

FIG. 3 is a diagram describing a second example of the control method used by the communication timing arbitration section 36_1 for allocating the first communication protection period for WPAN communication (WPAN communication protection period) and the second communication protection period for WLAN communication (WLAN communication protection period). That is, the diagram in FIG. 3 describes the scheduling of the communication periods according to the two communication schemes.

The allocation control method in the second example shows a case in which the WPAN and WLAN communication protection periods overlap. Further, the communication timing arbitration section 36_1 uses adaptive frequency hopping to control the identical network WPAN terminals of the WPAN 10_1 so that these identical network WPAN terminals use the same frequency band as the identical network WLAN terminals of the WLAN 20_1.

The WPAN communication protection period overlaps with the WLAN communication period (substantially the WLAN communication protection period). This provides a mixed WLAN/WPAN communication period during which WPAN communication is allowed also during the WLAN communication period. However, the period during which the WPAN and WLAN communication protection periods do not overlap does not differ from that in the first example.

FIG. 3 shows a timing diagram illustrating two communication periods, i.e., a mixed communication period of the WPAN 10_1 (substantially the WPAN communication protection period) and the WLAN 20_1 (substantially the WLAN communication protection period) and the WPAN communication period.

During the mixed communication period of the WPAN 10_1 and WLAN 20_1, both the WPAN 10_1 and WLAN 20_1 communicate. Further, at the end of the WLAN/WPAN mixed communication period, a CTS-Self packet containing a NAV is transmitted under MAC according to the IEEE802.11 standard as in the first example, thus preventing transmission of WLAN communication data during the WPAN communication period. The identical network WLAN terminals refrain from communication during the period indicated by the NAV in the CTS-Self packet, thus protecting WPAN communication from WLAN communication.

During the WPAN communication period, on the other hand, the identical network WPAN terminals use the same frequency band as the WLAN 20_1 by means of AFH rather than ordinary frequency hopping for communication. In this frequency band, WLAN communication is suppressed, ensuring "better protection" of WPAN data from WLAN data.

<Timing Arbitration: Third Example>

Figure 4:
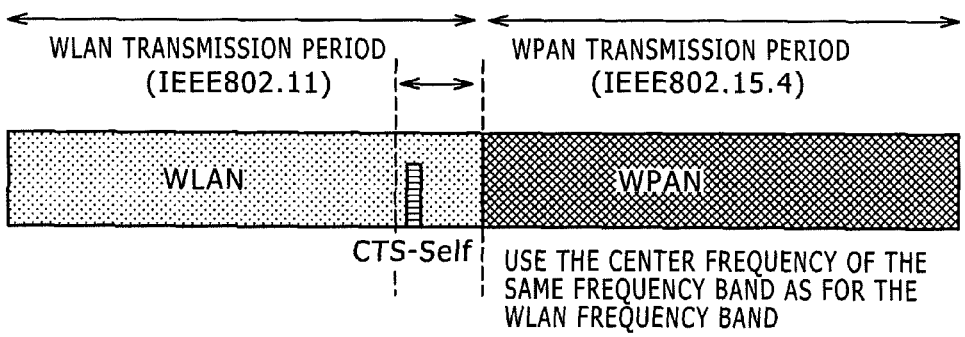
FIG. 4 is a diagram describing a third example of the control method of the communication timing arbitration section for allocating the communication protection periods.

FIG. 4 is a diagram describing a third example of the control method used by the communication timing arbitration section 36_1 for allocating the first communication protection period for WPAN communication (WPAN communication protection period) and the second communication protection period for WLAN communication (WLAN communication protection period). That is, the diagram in FIG. 4 describes the scheduling of the communication periods according to the two communication schemes.

The allocation control method in the third example shows a case in which the WPAN and WLAN communication protection periods do not overlap, as in the first example. Further, the communication timing arbitration section 36_1 controls the identical network WPAN terminals so that these identical network WPAN terminals use the center frequency of the same frequency band as used by the identical network WLAN terminals of the WLAN 20_1 for communication.

That is, the WPAN and WLAN terminals use the same frequency band except for the frequencies for adaptive frequency hopping. Although not illustrated, this mechanism is also applicable to a case in which the WPAN and WLAN communication protection periods overlap, as with the allocation control method in the second example.

The IEEE802.15.4 standard is used as the first communication scheme in the third example. In order to use the IEEE802.15.4 standard, the communication timing arbitration section 36_1 exercises control so that the first center frequencies used by the WPAN 10_1 and WLAN 20_1 are close to each other. For example, the communication timing arbitration section 36_1 controls the identical network WPAN terminals so that if channel 1 (2.412 GHz) is used by the WLAN 20_1, channel 12 (2.410 GHz) or channel 13 (2.415 GHz) is used by the WPAN 10_1.

As illustrated in FIG. 4, the period during which the WPAN and WLAN communication protection periods do not overlap in the third example does not differ from that in the first example. That is, at the end of the WLAN communication period, a CTS-Self packet containing a NAV is transmitted under MAC according to the IEEE802.11 standard as in the first example, thus preventing transmission of WLAN communication data during the WPAN communication period. The identical network WLAN terminals refrain from communication during the period indicated by the NAV in the CTS-Self packet, thus protecting WPAN communication from WLAN communication.

Further, the identical network WPAN terminals use the center frequency of the same frequency band as used by the WLAN 20_1 for communication. In this frequency band, WLAN communication is suppressed, ensuring "better protection" of WPAN data from WLAN data.

<Timing Arbitration: Fourth Example>

Figure 5A:
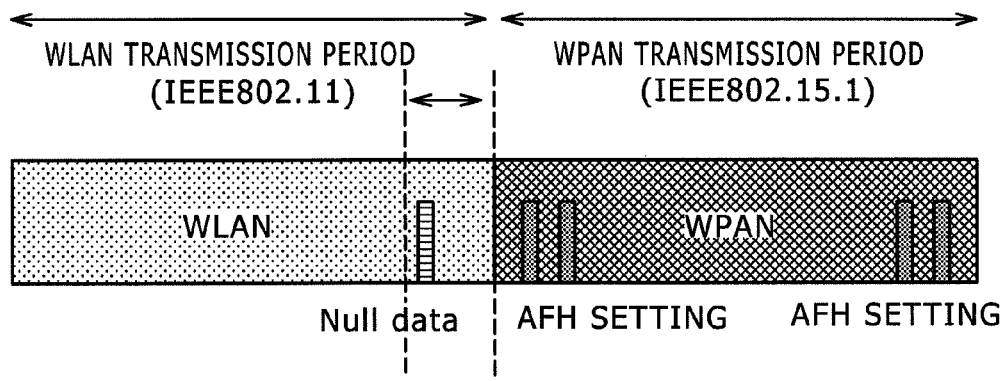
FIGS. 5A and 5B are diagrams describing a fourth example of the control method of the communication timing arbitration section for allocating the communication protection periods.
Figure 5B:
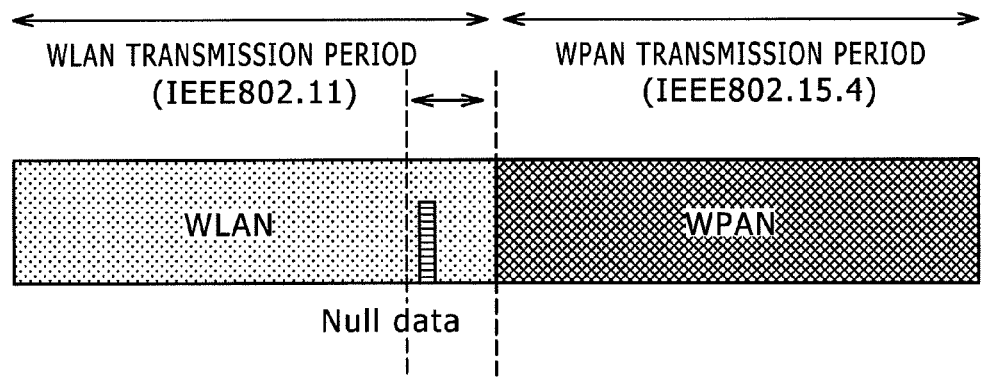

FIGS. 5A and 5B are diagrams describing a fourth example of the control method used by the communication timing arbitration section 36_1 for allocating the first communication protection period for WPAN communication (WPAN communication protection period) and the second communication protection period for WLAN communication (WLAN communication protection period). That is, the diagrams in FIGS. 5A and 5B describe the scheduling of the communication periods according to the two communication schemes.

The allocation control method in the fourth example is characterized in that a NAV is transmitted in "NULL data" rather than in a "CTS-Self packet." When "NULL data" is used, the WLAN terminal transmits NULL data, addressed to itself, containing a NAV. This transmission of a NAV in NULL data is equivalent to "transmission of a NAV in a CTS-Self packet" in the first and other examples and provides the same advantageous effects.

<Overview of the Communication Protection Mechanism of the Present Embodiment>

FIG. 6 is a diagram describing communication immune to interference thanks to the mechanism of the present embodiment and communication subject to interference. FIG. 6 is a simplified diagram of FIG. 1. In this figure, communications between non-identical networks immune to interference are denoted by "O," and those subject to interference by "x."

In the wireless communication system 1B, for example, a WPAN _11, WPAN _12, WPAN _13 and WPAN _14 belong to the WPAN 10_1 as WPAN terminals. The WPAN _11 corresponds to the data communication module 32_1. The WPAN _12, WPAN _13 and WPAN _14 correspond to the WPAN stations 14_1. A WLAN _11, WLAN _12, WLAN _13 and WLAN _14 belong to the WLAN 20_1 as WLAN terminals. The WLAN 11 corresponds to the data communication module 34_1. The WLAN _12, WLAN _13 and WLAN _14 correspond to the WLAN stations 24_1.

The same also holds true for the coexisting non-identical network 2. A WPAN _21, WPAN _22, WPAN _23 and WPAN _24 belong to the WPAN 10_2 as WPAN terminals. The WPAN _21 corresponds to a data communication module 32_2. The WPAN _22, WPAN _23 and WPAN _24 correspond to WPAN stations 14_2. A WLAN _21, WLAN _22, WLAN _23 and WLAN _24 belong to the WLAN 20_2 as WLAN terminals. The WLAN 21 corresponds to a data communication module 34_2. The WLAN _22, WLAN _23 and WLAN _24 correspond to WLAN stations 24_2. As for the WPAN non-identical network 3, a WPAN _31, WPAN _32, WPAN _33 and WPAN _34 belong to the same network 3 as WPAN terminals. The WPAN _31, WPAN _32, WPAN _33 and WPAN _34 correspond to WPAN stations 14_3. As for the WPAN non-identical network 4, a WPAN _41, WPAN _42, WPAN _43 and WPAN _44 belong to the same network 4 as WPAN terminals. The WPAN _41, WPAN _42, WPAN _43 and WPAN _44 correspond to WPAN stations 14_4.

As for the WLAN non-identical network 5, a WLAN _51, WLAN _52, WLAN _53 and WLAN _54 belong to the same network 5 as WLAN terminals. The WLAN _51, WLAN _52, WLAN _53 and WLAN _54 correspond to WLAN stations 24_5. As for the WLAN non-identical network 6, a WLAN _61, WLAN _62, WLAN _63 and WLAN _64 belong to the same network 6 as WLAN terminals. The WLAN _61, WLAN _62, WLAN _63 and WLAN _64 correspond to WLAN stations 24_6. As for the WLAN non-identical network 7, a WLAN _71, WLAN _72, WLAN _73 and WLAN _74 belong to the same network 7 as WLAN terminals. The WLAN _71, WLAN _72, WLAN _73 and WLAN _74 correspond to WLAN stations 24_7.

When we focus attention on the wireless communication system 1B, the control method for allocating the communication protection periods according to the present embodiment protects communication in the WPAN 10_1 not only from the identical network WLAN terminals belonging to the WLAN 20_1 but also from the non-identical WLAN terminals not belonging to the WLAN 20_1. Even if the networks around the wireless communication system 1B (identical coexisting network) are busy, the control method provides a desired throughput in the exchange of audio data and data having real-timeness by means of WPAN.

For example, the present embodiment is the same as the mechanism disclosed in Patent Document 1 in that the two can prevent interference in an identical coexisting network. However, the two differ in whether they can prevent interference from non-identical network communication terminals. The mechanism disclosed in Patent Document 1 cannot protect communication of the identical network WPAN terminals belonging to the WPAN 10_1 of the wireless communication system 1B shown in FIG. 6 from the WLAN terminals belonging to the non-identical networks such as the WLAN 20_2 of the coexisting non-identical network 2 and the WLAN non-identical networks 5 and 6. In contrast, the present embodiment provides an advantageous effect in that it can protect communication of the identical network WPAN terminals from the WLAN terminals belonging to the non-identical networks such as the WLAN 20_2 of the coexisting non-identical network 2 and the WLAN non-identical networks 5 and 6.

The present embodiment is also the same as the mechanism for coexistence of WLAN and WPAN disclosed in IEEE802.15.2 in that the two can prevent interference in an identical coexisting network. However, the two differ in whether they can prevent interference from non-identical network communication terminals. The mechanism defined in IEEE802.15.2 cannot protect communication of the identical network WPAN terminals belonging to the WPAN 10_1 of the wireless communication system 1B shown in FIG. 6 from the WLAN terminals belonging to the non-identical networks such as the WLAN 20_2 of the coexisting non-identical network 2 and the WLAN non-identical networks 5 and 6. In contrast, the present embodiment provides an advantageous effect in that it can protect communication of the identical network WPAN terminals from the WLAN terminals belonging to the non-identical networks such as the WLAN 20_2 of the coexisting non-identical network 2 and the WLAN non-identical networks 5 and 6.

As mentioned earlier, as for the WLAN/WPAN coexistence mechanisms defined in IEEE802.15.2, AWMA and PTA operate in the MAC layer. From the viewpoint of a higher level concept that the communication protection periods are guaranteed by means of time division multiplexing, these mechanisms do not differ from the mechanism according to the present embodiment. There is a difference between IEEE802.15.2 and the present embodiment as to how this time division multiplexing is conducted.

For example, AWMA, simply speaking, synchronizes the WLAN terminals in the same network to stop WLAN transmissions and receptions in a time-shared manner. This means that all the WLAN terminals voluntarily refrain from data transmissions, thus preventing interference with WPAN terminals. Therefore, the WLAN terminals are not synchronous with the WLAN terminals not belonging to the same network. As a result, it is impossible to prevent interference with the WLAN terminals outside the same network.

In contrast, the scheme according to the present embodiment transmits a specific control packet based on a WLAN protocol (more specifically, a packet containing a NAV indicating the first communication protection period), thus causing the WLAN terminals which receive this packet to refrain from data transmissions. As a result, not only the WLAN terminals in the same network but also those in different networks refrain from data transmissions if they receive this packet. This ensures protection of packets of the WPAN terminals in the same network from the WLAN terminals not only in the same network but also in different networks.

Further, the existing WLAN terminals (IEEE802.11-compliant terminals) are not equipped with the new AWMA functions adopted in the IEEE802.15.2 standard. Therefore, it is impossible to prevent interference from the existing WLAN terminals belonging to the same network. In contrast, the scheme according to the present embodiment transmits a control packet which is comprehensible even by the existing WLAN terminals, thus preventing interference also from the existing WLAN terminals.

Incidentally, the PTA scheme uses the arbitration section to monitor the WLAN/WPAN transmissions and receptions and give both the WLAN and WPAN terminals communication opportunities in a time-shared manner, thus preventing mutual interference. This function is also adopted in the present embodiment.

Further, as compared to the existing similar techniques (IEEE802.15.2 schemes), the mechanism according to the present embodiment is extremely simple, does not require any change to the existing devices and is expected to provide advantageous effects. As mentioned earlier, the IEEE802.15.2 scheme requires that new rules be defined in the existing IEEE802.11 standard. In contrast, the mechanism according to the present embodiment can be used by using the techniques within the scope of the IEEE802.11 standard. This provides high compatibility with the IEEE802.11 devices available today.

The mechanism according to the present embodiment differs from the mechanisms adapted to prevent mutual interference between the different derivative standards of the IEEE802.11 family in that the target communication to be protected is not IEEE802.11 communication. This difference allows for protection of non-IEEE802.11 communication from IEEE802.11 communication.

It should be noted, however, that because the mechanism according to the present embodiment transmits a NAV indicating the communication protection period of the WPAN 10_1 according to the WLAN scheme to protect WPAN communication from WLAN communication, it is impossible to prevent interference to communication in the WPAN 10_1 from WPAN communication in different networks using the same frequency band. Similarly, it is impossible to prevent interference to communication in the WLAN 20_1 from WPAN communication in different networks using the same frequency band.

For example, communication between the identical network WPAN terminals belonging to the WPAN 10_1 of the wireless communication system 1B in FIG. 6 may be subject to interference from the WPAN terminals belonging to the WPAN 10_2 of the coexisting non-identical network 2 and the WPAN non-identical networks 3 and 4. Similarly, communication between the identical network WLAN terminals belonging to the WLAN 20_1 of the wireless communication system 1B in FIG. 6 may be subject to interference from the WPAN terminals belonging to the WPAN 10_2 of the coexisting non-identical network 2 and the WPAN non-identical networks 3 and 4.

Further, the WLAN stations 24_7 belonging to the WLAN non-identical network 7 which have not received a packet containing a NAV indicating the first communication protection period at a given time may enter the communication-enabled area of the WPAN 10_1. In this case, if the WPAN 10_1 and WLAN non-identical network 7 communicate using the same frequency band, the identical network WPAN terminals belonging to the WPAN 10_1 may be subject to interference from the WLAN stations 24_7 which have moved into the communication-enabled area.

We assume, for example, that when a packet containing a NAV indicating the first communication protection period is transmitted from the wireless communication system 1B in FIG. 6, the WLAN _72 is not in the communication-enabled area of the same system 1B and therefore does not receive the packet. Later (specially immediately thereafter), when the WLAN _72 moves into the communication-enabled area of the wireless communication system 1B, and if the WLAN _72 uses the same frequency band as the wireless communication system 1B, the WLAN _72 may cause interference to the WPAN and WLAN terminals in the wireless communication system 1B.

In order to effectively prevent interference in such a case, it is only necessary to transmit a packet containing a NAV indicating the first communication protection period at shorter intervals. The time intervals at which a packet is to be transmitted depend on the mobile speed of the WLAN terminal. For example, when the terminal is moved at a relatively low speed as in the case of walking, the time intervals should be several seconds (3 to 5 seconds). On the other hand, when the terminal is moved at a relatively high speed as in the case of biking, the time intervals should be one or 0.5 seconds.

The present application contains subject matter related to that disclosed in Japanese Priority Patent Application JP 2009-007342 filed with the Japan Patent Office on Jan. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication terminal, comprising:
a communication timing arbitration section adapted to control the allocation of first and second communication protection periods, the first communication protection period being used for communication with a first wireless communication terminal belonging to a first communication network using a first communication scheme, and the second communication protection period being used for communication with a second wireless communication terminal belonging to a second communication network using a second communication scheme different from the first communication scheme, said first communication network being a non-identical network with respect to said second communication network, wherein
the communication timing arbitration section exercises control so that the first and second wireless communication terminals use the same frequency band before the first wireless communication terminal enters an active communication period, the communication timing arbitration section also exercises control so that a packet containing a network allocation vector is transmitted in said frequency band according to the second communication scheme used for said second wireless communication terminal belonging to said second communication scheme, the network allocation vector being adapted to define the communication protection period for the first wireless communication terminal, wherein said second wireless communication terminal is responsive to said network allocation vector even when said first wireless communication terminal is in said non-identical network to not communicate for the duration of said communication protection period.

2. The wireless communication terminal of claim 1, wherein
the communication timing arbitration section exercises control so that the network allocation vector is transmitted in a CTS-Self packet.

3. The wireless communication terminal of claim 1, wherein
the communication timing arbitration section exercises control so that the network allocation vector is transmitted in NULL data addressed to the own terminal.

4. The wireless communication terminal of claim 1, wherein
the communication timing arbitration section uses adaptive frequency hopping to control the first wireless communication terminal in such a manner as to use the same frequency band as the second wireless communication terminal for communication.

5. The wireless communication terminal of claim 1, wherein
the communication timing arbitration section controls the first wireless communication terminal in such a manner as to use the center frequency of the same frequency band as the second wireless communication terminal for communication.

6. The wireless communication terminal of claim 1, comprising
a communication processing section adapted to communicate with the first wireless communication terminal and stop communication with the second wireless communication terminal during the communication protection period in which the active communication period of the first wireless communication terminal is protected.

7. The wireless communication terminal of claim 1, comprising
a communication processing section adapted to communicate with the second wireless communication terminal and stop communication with the first wireless communication terminal during the communication protection period in which the active communication period of the second wireless communication terminal is protected.

8. The wireless communication terminal of claim 1, wherein
the second communication scheme is designed for WLAN compliant with the IEEE802.11 standard.

9. The wireless communication terminal of claim 1, wherein
the first communication scheme is designed for WPAN compliant with the IEEE802.15 standard.

10. The wireless communication terminal of claim 1, wherein
the communication timing arbitration section is housed in the same enclosure as first and second wireless communication sections respectively adapted to communicate with the first and second wireless communication terminals.

* * * * *